United States Patent

Keski-Jaskari

(10) Patent No.: US 7,710,405 B2
(45) Date of Patent: May 4, 2010

(54) KEYPAD AND/OR TOUCHPAD CONSTRUCTION

(75) Inventor: Turo Keski-Jaskari, Vantaa (FI)

(73) Assignee: Nokia Corporation, Espoo (FI)

( * ) Notice: Subject to any disclaimer, the term of this patent is extended or adjusted under 35 U.S.C. 154(b) by 798 days.

(21) Appl. No.: 11/645,471

(22) Filed: Dec. 26, 2006

(65) Prior Publication Data

US 2008/0150912 A1 Jun. 26, 2008

(51) Int. Cl.
*G06F 3/041* (2006.01)

(52) U.S. Cl. .................. 345/173; 345/156; 345/169

(58) Field of Classification Search ......... 345/156–173; 178/18.01–18.04; 200/513; 400/472–479, 400/490
See application file for complete search history.

(56) References Cited

U.S. PATENT DOCUMENTS

| | | | |
|---|---|---|---|
| 7,609,178 B2 * | 10/2009 | Son et al. .................. 341/33 |
| 2003/0058223 A1 * | 3/2003 | Tracy et al. ............... 345/169 |
| 2004/0056877 A1 * | 3/2004 | Nakajima .................. 345/702 |
| 2004/0196270 A1 * | 10/2004 | Chiu et al. ................. 345/174 |
| 2005/0007349 A1 * | 1/2005 | Vakil et al. ................ 345/173 |
| 2007/0070044 A1 * | 3/2007 | Yeh et al. .................. 345/169 |
| 2007/0111750 A1 * | 5/2007 | Stohr et al. .............. 455/550.1 |
| 2007/0171215 A1 * | 7/2007 | Song ......................... 345/204 |
| 2007/0236470 A1 * | 10/2007 | Abanami et al. ........... 345/173 |
| 2007/0236472 A1 * | 10/2007 | Bentsen et al. ............ 345/173 |
| 2007/0285398 A1 | 12/2007 | Karhiniemi et al. ....... 345/173 |
| 2007/0296709 A1 * | 12/2007 | GuangHai .................. 345/173 |
| 2008/0067527 A1 * | 3/2008 | Daniels et al. ............... 257/88 |
| 2009/0198013 A1 * | 8/2009 | Shin et al. ................... 524/611 |

* cited by examiner

*Primary Examiner*—Nitin Patel
(74) *Attorney, Agent, or Firm*—Harrington & Smith

(57) ABSTRACT

A capacitive keypad and/or touchpad construction includes a flexible or rigid printed circuit board and a non-conductive keypad/touchpad top surface layer. A semi-conductive adhesive layer in between said flexible or rigid printed circuit board and said non-conductive keypad/touchpad top surface layer serves both to connect the top surface layer to the printed circuit board and to act as capacitive sensing layer.

11 Claims, 2 Drawing Sheets

KEYPAD AND/OR TOUCHPAD CONSTRUCTION

FIELD OF THE INVENTION

The present invention relates to capacitive keypad and/or touchpad constructions and to mobile electronic devices including a keypad and/or touchpad construction.

BACKGROUND OF THE INVENTION

Capacitive touchpads or keypads that include a layer of semi-conductive material are known, and find widespread use in mobile electronic devices. When using a capacitive sensor in impedance measurement configuration in a there is always a need for a sheet or layer of semi-conductive material. Making good connections to this semi-conductive material is difficult, as soldering is most often not possible, and wiring is always hard and expensive. Previous solutions used a paper sheet or ITO that has a certain square-resistance, suitable for the impedance based capacitive sensing usage. The problem is related to this construction is the problem of making reliable connections from the paper sheet to the electronics. Attaching wires is difficult, as the materials cannot tolerate heat (for soldering), and silver paste is not very robust in use.

Also, thinness of keypads and touchpads is a crucial factor in the modern mobile device business.

DISCLOSURE OF THE INVENTION

On this background, it is an object of the present invention to provide a capacitive keypad and/or touchpad construction that overcomes or at least reduces the above drawbacks.

This object is achieved by providing a capacitive keypad and/or touchpad construction comprising a flexible or rigid printed circuit board, a non-conductive keypad/touchpad top surface layer, and a semi-conductive adhesive layer in between the flexible or rigid printed circuit board and the non-conductive keypad/touchpad top surface layer.

By using the semi-conductive layer both as constructional and as sensing element, it becomes possible to create a thin keypad in which the non-conductive top surface layer is well secured to the printed circuit board.

The semi-conductive adhesive layer may comprise a layer of semi-conductive glue.

The semi-conductive adhesive layer may comprise a semi-conductive double sided adhesive tape.

The top surface of the non-conductive keypad/touchpad top surface layer may be provided with a keypad print.

The top surface of the non-conductive keypad/touchpad top surface layer may be provided with embossed button shapes.

The capacitive keypad and/or touchpad construction may further comprise haptically active elements.

The haptically active elements may comprise one or more piezo disks.

The printed circuit board can be flexible and layered over a plurality of collapsible domes that are disposed on a substrate.

The flexible printed circuit board may have corner galvanic (copper) electrodes and only the glue or double sided tape and the surface layer on top of that. The connections that the adhesive forms like this are very firm and robust, and the module can even be bendable, as the adhesive can stretch in between the layers.

A device comprising a capacitive keypad and/or touchpad construction according to the invention may be configured to interpret a sliding contact with the keypad and/or touchpad construction as a navigational input and a pressing contact with the keypad and/or touchpad construction as a keystroke input.

It is another object of the invention to provide a mobile electronic device comprising a capacitive keypad and/or touchpad with a flexible or rigid printed circuit board, a non-conductive keypad/touchpad top surface layer, and a semi-conductive adhesive layer in between the flexible or rigid printed circuit board and the non-conductive keypad/touchpad top surface layer.

It is yet another object of the invention to provide a method of operating a keypad, said keypad comprising a flexible touch sensitive layer overlaying one or more biased switches, said method comprising interpreting sliding contact with the surface of the keypad as navigational input and interpreting a static pressure contact on one of said biased switches as a keystroke.

Further objects, features, advantages and properties of the keypad, touchpad and mobile device according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the keypad/touchpad according to the invention will be described in detail and as an implementation in a mobile device, e.g. a PDA, mobile terminal or a mobile communication terminal an in detail in the form of a cellular/mobile phone by the preferred embodiments.

Figure 1:
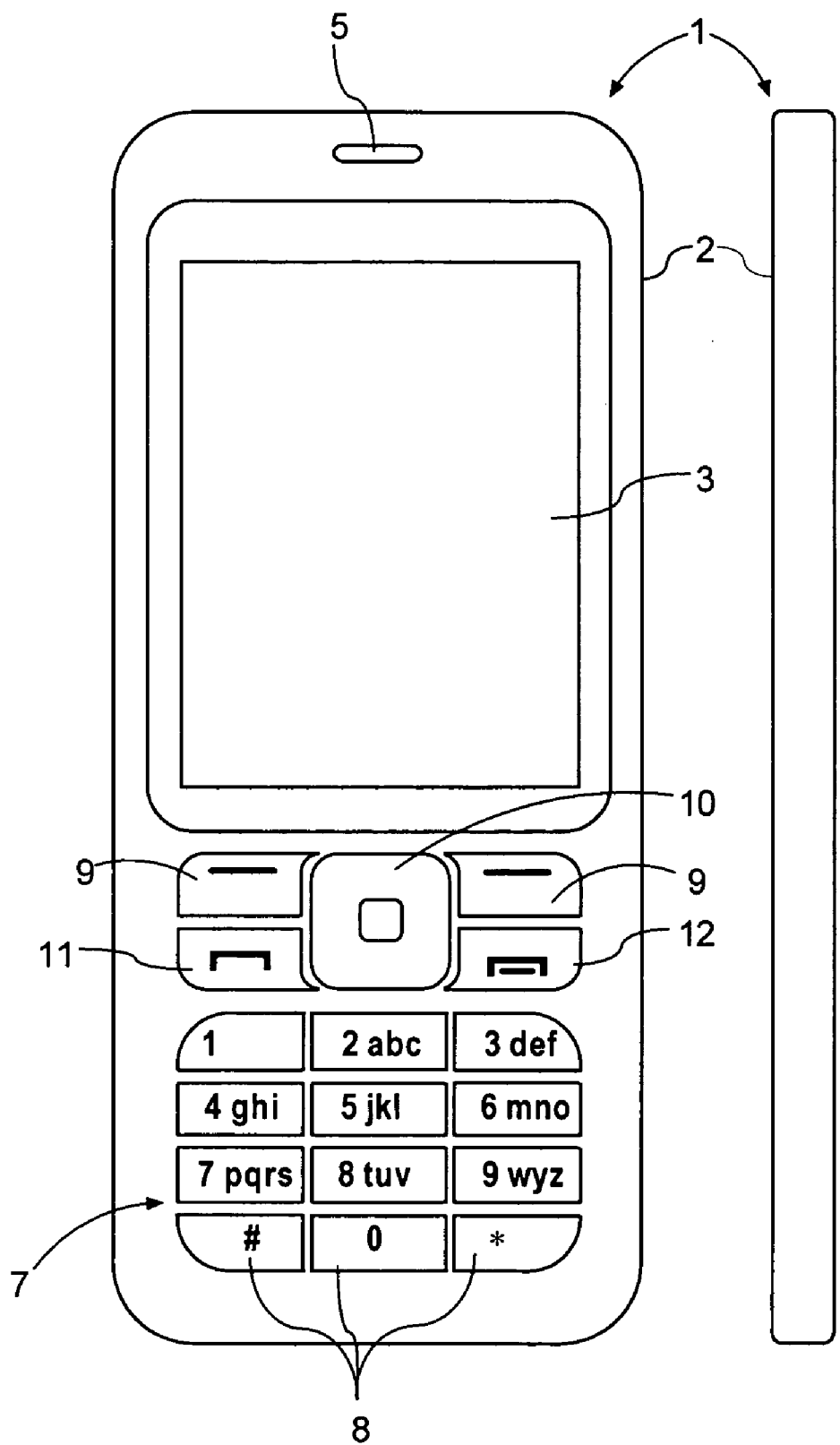
FIG. 1 is a front view of a mobile device according to an embodiment of the invention.

FIG. 1 illustrates a first embodiment of a mobile device according to the invention in the form of a mobile telephone by a front view and a side view. The mobile phone 1 comprises a user interface having a housing 2, a display 3, an on/off button (not shown), a speaker 5 (only the opening is shown), and a microphone 6 (not visible in FIG. 1). The phone 1 according to the first preferred embodiment is adapted for communication via a cellular network, such as the GSM 900/1800 MHz network, but could just as well be adapted for use with a Code Di-vision Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 is of the a capacitive touch sensing type and has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing. The alphanumeric keys 8 are realized by keypad print, and are in an embodiment provided with embossed structure outlining the keys to improve the haptic experience (embossed button shapes, not shown in FIG. by the outline of the keys).

The keypad 2 has additionally a second group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation key 10. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call. This key layout is typical for may mobile phones, however, it is understood that completely different layout for the keypad and user interface can be used with different embodiments of the invention.

The navigation key 10 is a four- or five-way key which can be used for cursor movement, scrolling and selecting (five-way key) and is placed centrally on the front surface of the phone between the display 3 and the group of alphanumeric keys 7.

A releasable rear cover (not shown) gives access to the SIM card (not shown), and the battery pack (not shown) in the back of the phone that supplies electrical power for the electronic components of the mobile phone 1.

The mobile phone 1 has a flat display 3 that is typically made of an LCD with optional back lighting, such as a TFT matrix capable of displaying color images. A touch screen may be used on top of a conventional LCD display.

Figure 2:
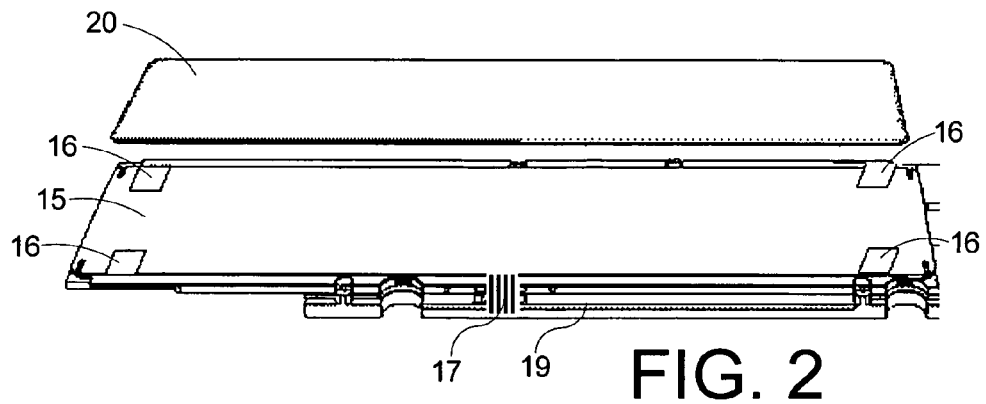
FIGS. 2 to 4 are exploded elevated views of a keypad/touchpad according to an embodiment of the invention.
Figure 3:
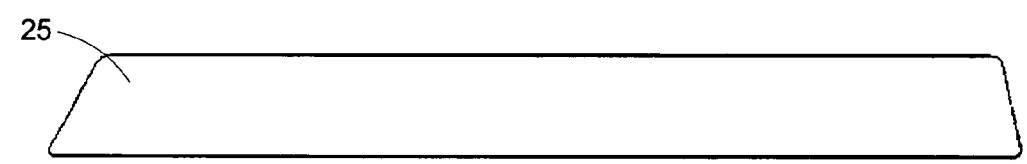
Figure 4:
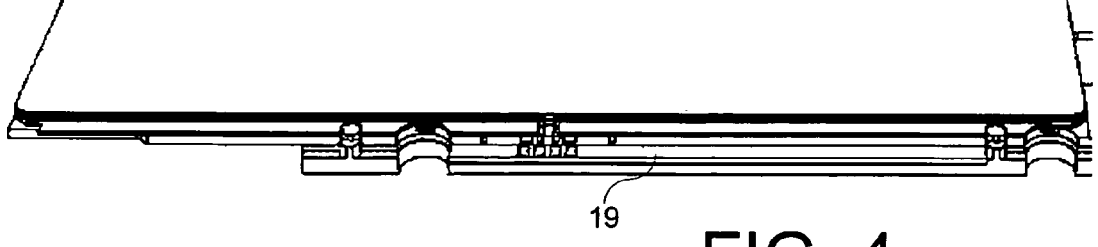

FIGS. 2 to 4 show an embodiment of the keypad/touchpad by a series of exploded elevated views. The basis or substrate of the keypad/touchpad is a printed circuit board 15. The upper surface of the printed circuit board is at four corners provided with galvanic (copper) electrodes/connections. The printed circuit board 15 can be of a flexible type, in which case the printed circuit board 15 is provided with a flex connection tail 17. If the printed circuit board 15 is of the rigid type, there will not be any flex connection tail. If the printed circuit board 15 is of the flexible type it will in the housing of the mobile device 1 be supported by another substrate, for example a stable surface formed by the frame or housing 2.

A semi-conductive double-sided tape 20 is placed on top of the printed circuit board 15 and secured to the printed circuit board by the adhesive effect of the double-sided tape. Alternatively, a thin layer of semi-conductive glue can be used instead of the adhesive tape 20. Suitable types of semi-conductive tape and glue are commercially available from 3M®, MN, USA.

The layer of semi-conductive glue or the semi-conductive tape 20 can be relatively thin, for example approximately 0.1 mm.

A non-conductive top layer 25 is placed on top of the semi-conductive layer 20 and secured by the adhesive effect of the semi-conductive layer. The top layer 25 is provided with keypad print and eventually embossments if the device is to be a keypad. If the device is to be a touchpad there will be no keypad print on the top layer 25. The non-conductive top layer 25 can be relatively thin, for example approximately 0.1 mm.

The keypad/touchpad can in an embodiment be supported by a structural element 19 of the mobile device 1.

Thus, the adhesive layer 20 serves both as the constructional element that holds the layers together and as the sensor for capacitive measurement for detecting if the keypad/touchpad has been touched. The resulting total thickness above the printed circuit board can thus be as low as approximately 0.2 mm.

The connection to the flexible or rigid printed circuit board 15 becomes good by providing the four corners of electrodes 16 as plain copper or gold-plated pads on the printed circuit board 15.

When the conductive adhesive layer 20 is applied on top of the printed circuit board 15, it will make a firm and non-varying contact to each contact point 16. The adhesive layer itself is also flexible and keeps the connection strong even if the structure is built for example over collapsible keydomes (not shown) to give haptic feedback for the user. A flexible printed circuit board has to be used to allow the keypad to be build over keydomes.

Together with collapsible keydomes the flexible capacitive keypad can also form a "double-action keypad", with sliding finger movements detected by the capacitive sensor, and button presses by the domes. Thus, the keypad has real physical buttons including the haptic feedback of pushbutton/resilient switches but can still be used as a capacitive touchpad for navigational input and has therefore a double function. In this embodiment a conventional matrix keypad decoder may not be required, all switches could be connected in parallel and indicate the pressed down state whilst the capacitive sensor detects which key the user pressed According to an embodiment (not shown) the capacitive keypad and/or touchpad construction comprise haptically active elements, such more piezo disks.

According to an embodiment, the mobile device 1 with the capacitive keypad 7 mounted on collapsible keydomes is configured to interpret a sliding contact with said keypad and/or touchpad construction as a navigational input and a pressing contact with said keypad and/or touchpad construction as a keystroke input.

According to an embodiment (not shown) the semi-conductive layer is interrupted by a pattern of non-conductive paths to reduce pincushion errors, as described in detail in U.S. Ser. No. 11/449,434, hereby incorporated by reference.

The invention has numerous advantages. Different embodiments or implementations may yield one or more of the following advantages. It should be noted that this is not an exhaustive list and there may be other advantages which are not described herein. One advantage of the invention is that it allows for a very thin keypad/touchpad construction. Another advantage of the invention is that it allows for a flexible keypad/touchpad construction. A further advantage of the invention is that it allows for a combined press and touch sensitive keypad/touchpad. Yet another advantage of the invention is that it ensures a good connection between the non-conductive top layer and the printed circuit board. Another advantage of the invention is that it allows for flexible keep that that can be mounted over curved structure.

The term "comprising" as used in the claims does not exclude other elements or steps. The term "a" or "an" as used in the claims does not exclude a plurality.

Although the present invention has been described in detail for purpose of illustration, it is understood that such detail is solely for that purpose, and variations can be made therein by those skilled in the art without departing from the scope of the invention.

The invention claimed is:

1. A capacitive keypad and/or touchpad construction comprising:
    a flexible or rigid printed circuit board,
    a non-conductive keypad/touchpad top surface layer, and
    a semi-conductive adhesive layer in between said flexible or rigid printed circuit board and said non-conductive keypad/touchpad top surface layer.

2. A capacitive keypad and/or touchpad construction according to claim 1, wherein said semi-conductive adhesive layer comprises a layer of semi-conductive glue.

3. A capacitive keypad and/or touchpad construction according to claim 1, wherein said semi-conductive adhesive layer comprises a semi-conductive double sided adhesive tape.

4. A capacitive keypad and/or touchpad construction according to claim 1, wherein the top surface of said non-conductive keypad/touchpad top surface layer is provided with a keypad print.

5. A capacitive keypad and/or touchpad construction according to claim 4, wherein the top surface of said non-conductive keypad/touchpad top surface layer is provided with embossed button shapes.

6. A capacitive keypad and/or touchpad construction according to claim 4, further comprising haptically active elements.

7. A capacitive keypad and/or touchpad construction according to claim 6, wherein said haptically active elements comprise one or more piezo disks.

8. A capacitive keypad and/or touchpad construction according to claim 1, wherein said printed circuit board is flexible and layered over a plurality of collapsible domes that are disposed on a substrate.

9. A device comprising a capacitive keypad and/or touchpad construction according to claim 8, said device being configured to interpret a sliding contact with said keypad and/or touchpad construction as a navigational input and a pressing contact with said keypad and/or touchpad construction as a keystroke input.

10. A mobile electronic device comprising a capacitive keypad and/or touchpad with a flexible or rigid printed circuit board, a non-conductive keypad/touchpad top surface layer, and a semi-conductive adhesive layer in between said flexible or rigid printed circuit board and said non-conductive keypad/touchpad top surface layer.

11. A method of operating a keypad, said keypad comprising a flexible touch sensitive layer overlaying one or more biased switches, said method comprising interpreting sliding contact with the surface of the keypad as navigational input and interpreting a static pressure contact on one of said biased switches as a keystroke.

* * * * *